(12) United States Patent
McHale et al.

(10) Patent No.: US 10,612,890 B2
(45) Date of Patent: Apr. 7, 2020

(54) OPTICAL DEVICE WITH DAY VIEW AND SELECTIVE NIGHT VISION FUNCTIONALITY

(71) Applicant: Trackingpoint, inc., Pflugerville, TX (US)

(72) Inventors: John Francis McHale, Austin, TX (US); Douglas Richard Hammond, Austin, TX (US)

(73) Assignee: Talon Precision Optics LLC, Jacksonville, FL (US)

( * ) Notice: Subject to any disclaimer, the term of this patent is extended or adjusted under 35 U.S.C. 154(b) by 0 days.

(21) Appl. No.: 15/939,601

(22) Filed: Mar. 29, 2018

(65) Prior Publication Data

US 2019/0353455 A1 Nov. 21, 2019

(51) Int. Cl.
*F41G 1/32* (2006.01)
*F41G 1/34* (2006.01)
*H04N 5/335* (2011.01)
*F41G 1/38* (2006.01)
*G02B 23/12* (2006.01)
*G02B 23/02* (2006.01)

(52) U.S. Cl.
CPC ............ *F41G 1/345* (2013.01); *F41G 1/38* (2013.01); *G02B 23/02* (2013.01); *G02B 23/12* (2013.01); *H04N 5/335* (2013.01)

(58) Field of Classification Search
None
See application file for complete search history.

(56) References Cited

U.S. PATENT DOCUMENTS

| | | | | |
|---|---|---|---|---|
| 3,712,702 A * | 1/1973 | Schmidt | ........... | G02B 23/12 313/524 |
| 5,035,472 A * | 7/1991 | Hansen | ........... | F41G 11/001 250/333 |
| 5,084,780 A * | 1/1992 | Phillips | ........... | G02B 23/12 359/350 |
| 5,140,151 A * | 8/1992 | Weiner | ........... | G02B 23/12 359/226.2 |
| 5,497,266 A * | 3/1996 | Owen | ........... | G02B 17/0808 348/164 |
| 5,892,617 A * | 4/1999 | Wallace | ........... | G02B 23/12 356/5.01 |
| 5,946,132 A * | 8/1999 | Phillips | ........... | G02B 23/12 359/350 |
| 6,111,692 A * | 8/2000 | Sauter | ........... | G02B 23/12 359/399 |

(Continued)

*Primary Examiner* — Reginald S Tillman, Jr.
(74) *Attorney, Agent, or Firm* — RM Reed Law PLLC

(57) ABSTRACT

In some embodiments, an apparatus can include an optical device configured to provide a day view image mode and a night view image mode. The optical device may include an optics assembly configured to receive light from a view area and a control circuit including one or more sensors and a display interface. The control circuit may be configured to receive a mode selection input and to selectively enable at least one of the display interface and the one or more sensors in response to the mode selection input indicating a night view image mode. The optical device may also include an optical element responsive to a signal from the control circuit to direct at least a portion of the light toward the one or more sensors.

20 Claims, 13 Drawing Sheets

(56) References Cited

U.S. PATENT DOCUMENTS

| | | | | |
|---|---|---|---|---|
| 6,169,628 B1 * | 1/2001 | Isbell | ............... | F41G 1/38 |
| | | | | 359/399 |
| 6,204,961 B1 * | 3/2001 | Anderson | ............... | F41G 3/065 |
| | | | | 359/353 |
| 6,295,170 B1 * | 9/2001 | Wallace | ............... | F41G 1/38 |
| | | | | 359/813 |
| 7,961,381 B2 * | 6/2011 | Pochapsky | ............... | F41G 3/165 |
| | | | | 359/353 |
| 10,075,646 B2 * | 9/2018 | Nguyen | ............... | H04N 5/23229 |

* cited by examiner

OPTICAL DEVICE WITH DAY VIEW AND SELECTIVE NIGHT VISION FUNCTIONALITY

FIELD

The present disclosure is generally related to optical devices, such as rifle scopes and telescopes, and more particularly to an optical device with day view and selective night vision functionality.

BACKGROUND

Portable optical devices, such as spotting scopes, binoculars, monoculars, cameras, and telescopes may provide increased magnification, but are typically limited to daytime use. In some examples, portable optical devices may be configured to mount to a firearm, such as a rifle or other firearm, and may be configured to include a reticle.

SUMMARY

In some embodiments, an apparatus can include an optical device configured to provide a day view image mode and a night view image mode. The optical device may include an optics assembly configured to receive light from a view area and a control circuit including one or more sensors and a display interface. The control circuit may be configured to receive a mode selection input and to selectively enable at least one of the display interface and the one or more sensors in response to the mode selection input indicating a night view image mode. The optical device may also include an optical element responsive to a signal from the control circuit to direct a portion of the light toward the one or more sensors.

In some other embodiments, an apparatus may include an optical device configured to provide a day view image mode and a night view image mode. The optical device may include a plurality of lenses including an objective lens to receive light from a viewing area and including a viewing lens through which a user may perceive at least a portion of the received light. The plurality of lenses may be configured to focus the received light along a light path from the objective lens to the viewing lens. The optical device may further include an optical element disposed between the aperture and the viewing lens and configured to selectively redirect a portion of the light from the light path. The optical device may also include a control circuit including one or more sensors, at least one processor circuit, and a display interface. The control circuit may be configured to selectively disable at least one of the display interface and the one or more sensors in the day view image mode and to selectively enable at least one of the display interface and the one or more sensors in a night view image mode.

In still other embodiments, an apparatus can include an optical device including an optics assembly configured to receive light from a view area through an objective lens and to focus the light toward a viewing lens. The optical device may include one or more optical sensors, an optical element configured to selectively direct a portion of the light toward the one or more optical sensors, and a control circuit configured to receive a mode selection input. When the mode selection input indicates a day view image mode, the control circuit may be configured to selectively disable the one or more sensors and to control the optical element to not direct the portion. When the mode selection input indicates a night view image mode, the control circuit may be configured to selectively enable the one or more sensors and to control the optical element to direct the portion toward the one or more optical sensors.

BRIEF DESCRIPTION OF THE DRAWINGS

In the following drawings, reference numbers may be reused to indicate the same or similar elements.

DETAILED DESCRIPTION OF ILLUSTRATIVE EMBODIMENTS

Figure 1:
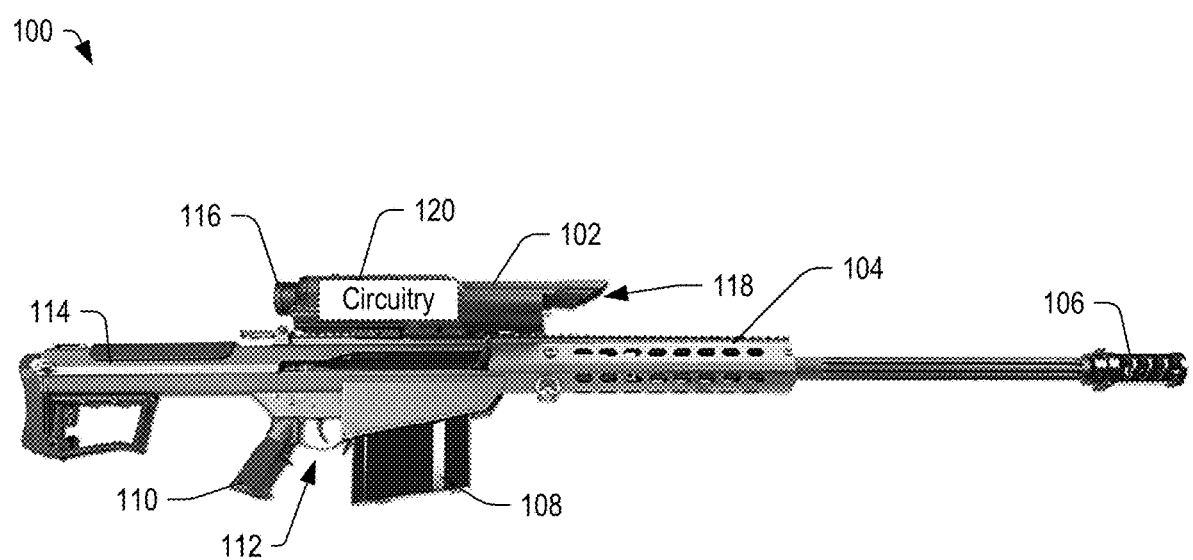
FIG. 1 depicts a side view of a firearm system including an optical device with selective night vision functionality, in accordance with certain embodiments of the present disclosure.

In the following detailed description of the embodiments, reference is made to the accompanying drawings which form a part hereof, and in which are shown by way of illustration of specific embodiments. It is to be understood that other embodiments may be utilized and structural changes may be made without departing from the scope of the present disclosure.

Day view optical scopes rely on ambient light to illuminate the view area, and the user may perceive the view area of the optical device according to the available ambient light. In low light conditions, the day view optical scope may be less useful.

Embodiments of an optical device are described below that may be configured to provide two or more viewing modes. In a day view mode, the optical device may provide a direct view image to a viewing lens of the optical device. In a night view mode, the optical device may provide a digital image to the viewing lens, where the digital image is derived from data determined from one or more optical sensors configured to receive light from the viewing area. In a fused image mode, the optical device may be configured to fuse the digital image with the direct view image and provide the fused image to the viewing lens. Other viewing modes are also possible.

In some embodiments, the reticle may be etched on a surface placed at a focal plane. In other embodiments, the reticle may be digitally generated and superimposed over the scene by a light-emitting diode (LED) display, a liquid crystal display (LCD), an organic light-emitting diode (OLED) display, a liquid crystal on silicon (LCoS) display, a laser simulated hologram display, another display, or any combination thereof.

The optical device may include one or more optical sensors configured to capture light from the view area. The optical sensors may include a complementary metal oxide semiconductor (CMOS) array, a charge-coupled device (CCD) array, an avalanche photodiode (APD) array, a cooled or uncooled infrared detector array, a short-wave infrared (SWIR) array, a midwave infrared (MWIR) sensor, a long wave infrared sensor (LWIR), another optical sensor circuit, or any combination thereof.

In the night view mode or in the fused image mode, the sensor data can be provided to a processor of the optical device, which may be configured to provide display data to the same display that may be used to generate the reticle. The display data may be provided to the viewing lens via a combination of a collimating lens, a beam splitter, a collimating half-silvered mirror, a polished metal mirror, a dielectric mirror, a coated glass mirror, a switchable mirror, an IR mirror, another optical element, or any combination thereof.

In some embodiments, when the display is activated and the one or more beam splitter elements are activated, image data captured by the sensor and optionally the reticle may be provided to the viewing lens to provide a fused optical view. In one possible example, if the reflecting device is a beam splitter or collimating half silvered/dichroic mirror, and if the display is activated to project the image data received from the sensor (and optionally the reticle), the optical device may be in a fused viewing mode in which the image data from the display (including the reticle) may be fused with the direct view image to provide a fused image to the viewing lens. In a particular example, the digital image data from the display may be superimposed on the direct view image to produce the fused image.

In another particular embodiment, if the reflecting device is a polished metal mirror, a dielectric mirror, an infrared mirror, a coated glass mirror, a mechanically or electrically switchable mirror, an IR mirror, and another light splitting element and if the display is activated to project the image data received from the optical sensor (and optionally to project the reticle), the optical device may be in a night view mode. In some embodiments, the mirrors and beam splitters can be electrically or mechanically switched in and out of the optical path to enable the different viewing modes.

In some embodiments, a switchable mirror can be switched in and out of the optical path to receive light from the objective lens system. When switched into the optical path the mirror reflects the received light toward the sensor (Night Vision). When the mirror is switched out of the optical path received light passes optically to the human eye (Day Vision). The switchable mirror can be mechanically switched or can also be comprised of a liquid crystal (LC) or other material that can be electrically switched from reflective to transparent. The mirror can be polished metal mirror, dielectric mirror, coated glass mirror, or IR mirror. When in night vision mode the sensor image is transmitted to a single display which could be an LCD, OLED, or LCoS display. When in night vision mode a second switchable mirror is switched into the optical path to receive light from the display. The light received from the display is reflected through the ocular lens system to the human eye.

Embodiments of an optical device, such as a telescope, spotting scope, or a rifle scope, are described below that may be configured to operate in a day view mode, a night view mode, and a fused image mode. In some embodiments, the optical device includes one or more light-splitting elements configured to direct at least a portion of the received light toward one or more optical sensors. The portion of the light may include all of the received light (less a fraction that may be lost due), light of certain frequencies, a percentage of the received light, or any combination thereof. In some embodiments, the one or more optical sensors may be configured to sense light in a particular range of frequencies, such as an infrared frequency range. One example of an optical device is described below with respect to FIG. 1.

FIG. 1 depicts a side view of a firearm system 100 including an optical device 102 with selective night vision functionality, in accordance with certain embodiments of the present disclosure. The optical device 102 may be coupled to a firearm 104. While the firearm 104 is depicted as a semiautomatic rifle, the firearm 104 is illustrative only, and the optical device 102 may be used with other types of rifles and other projectile weapons, such as an airsoft gun, a pistol, a bow, or another type of projectile weapon.

In the illustrated example, the firearm 104 includes a muzzle 106, a magazine 108, a grip 110, a trigger assembly 112, and a stock 114. In some embodiments, batteries may be included within the stock 114. Further, in some embodiments, the trigger assembly 112 may be electronically coupled to the optical device 102, and the discharge of the firearm 104 may be selectively controlled by a microprocessor within the optical device 102. In a particular implementation, the microprocessor may be configured to process optical data from a view area of the optical device and to control the timing of discharge of the firearm 104 (such as by selectively restricting and allowing release of the firing pin) based on a determination of the alignment of the aim point of the firearm 104 relative to a selected target within the view area.

The optical device 102 may include an objective lens system 118, which may receive light from the view area of the optical device 102 and which may focus the received light toward a viewing lens 116 along a direct view optical path. The optical device 102 may also include circuitry 120, which may include sensors (optical, environmental, tilt, motion, and so on), processing circuitry, a display, control circuitry, other circuitry, or any combination thereof. In some embodiments, the optical device 102 may include optical components that can be selectively activated (mechanically or electrically moved into and out of the light path) to selectively direct at least a portion of received light toward one or more sensors of the circuitry 120.

In some embodiments, the objective lens system 118 may include one or more apertures configured to receive light associated with the view area. In one possible embodiment, light from a view area may be received through a single aperture and provided as a direct view image to the viewing lens 116. In a night view mode or in a fused image mode, at least a portion of the received light (such as received light within a particular range of frequencies) may be directed toward an optical sensor by moving a splitter or mirror device into the light path to redirect the portion of the received light from the light path toward the optical sensor. Other embodiments are also possible.

In an alternative embodiment, the objective lens system 118 may include multiple apertures. In this embodiment, the light received by a first aperture may be directed toward a first sensor (such as a sensor configured to receive reflected laser light for a laser range finder circuit). The light received by a second aperture may be provided to the viewing lens 116 through a direct view optical path and at least a portion of the received light through the second aperture may be selectively directed toward a sensor, such as a low-light or infrared sensor, by moving a splitter or mirror into the direct view optical path. In a particular embodiment, the splitter or mirror may be moved into the direct view optical path in response to an input received from a user-selectable element (such as a button), or automatically in response to ambient light measurements falling below a low light threshold. Other embodiments are also possible.

In the illustrated embodiment of FIG. 1, the optical device 102 is implemented as a firearm scope. However, it should be appreciated that the multiple modes (day view, night view, and optionally fused image view modes) can be implemented in any type of optical device, including a firearm scope, a spotting scope, a telescope, a camera, a pair of binoculars, or another optical device.

While the optical device 102 has a narrow and elongate profile, it should be appreciated that other form factors and other implementations are also possible. An example of an optical device with a different form factor is described below with respect to FIG. 2.

Figure 2:
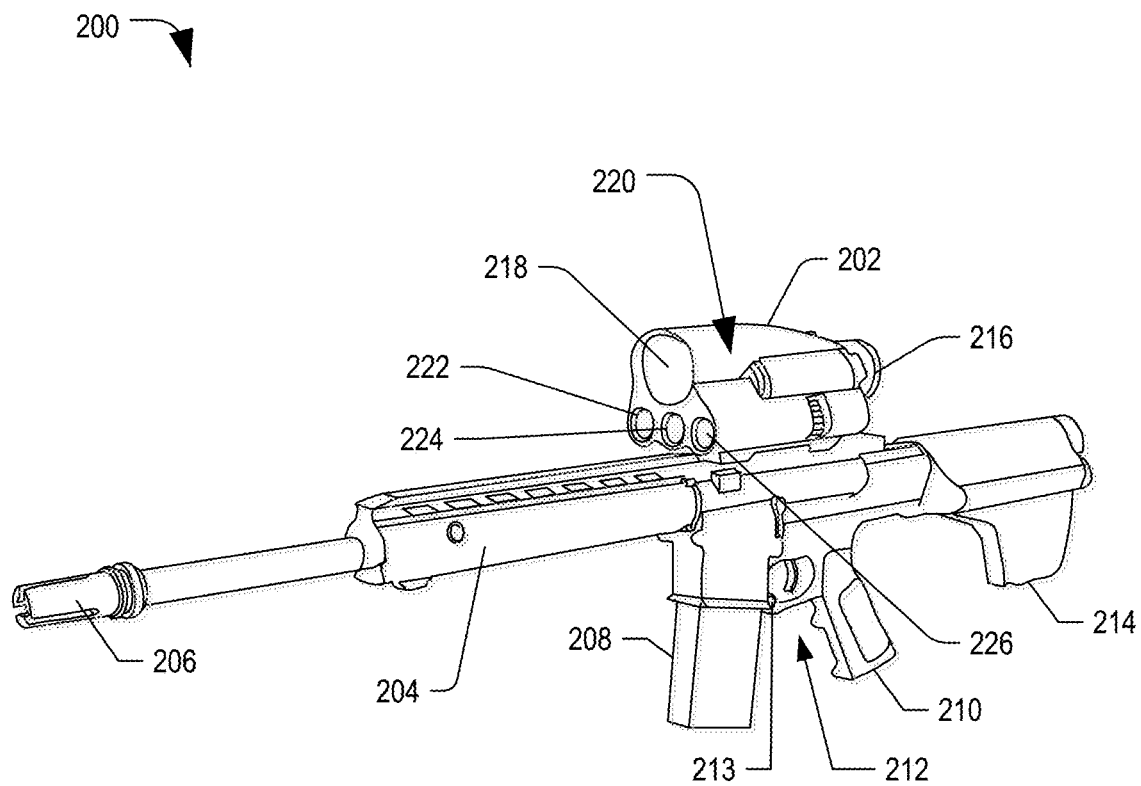
FIG. 2 depicts a perspective view of a firearm system including an optical device with selective night vision functionality, in accordance with certain embodiments of the present disclosure.

FIG. 2 depicts a perspective view of a firearm system 200 including an optical device 202 with selective night vision functionality, in accordance with certain embodiments of the present disclosure. The optical device 202 may be an alternative embodiment (alternative form factor) of the optical device 102 in FIG. 1. In this example, the optical device 202 may be mounted to a firearm 204, which may include a muzzle 206, a magazine 208, a grip 210, a trigger assembly 212, and a stock 214. In this example, the trigger assembly 212 may include at least one user-selectable button 213, which may be accessed by the user to initiate and optionally control one or more functions, such as a target selection and tagging function. In a particular embodiment, the trigger assembly 212 and the user-selectable button 213 may be electrically coupled to the optical device 202.

In the illustrated example, the optical device 202 may include a plurality of apertures 218, 220, 224, and 226, at least some of which may be configured to receive light associated with a view area of the optical device 202. The optical device 202 may include various optical components configured to provide a direct image view. Further, the optical device 202 may include circuitry, generally indicated at 220, which may be configured to selectively provide a digital image view in a night view mode or a combination of a direct view image and a digital image in a fused image view mode. In an example, in response to selecting the user-selectable button on the optical device 202, a splitter or mirror element may be moved into the direct view light path to direct at least a portion of the received light toward one or more optical sensors. In one embodiment, the circuitry 220 may control an actuator to move the splitter or mirror into the light path. In another embodiment, the user-selectable element may include a lever or switch that may be coupled to the mirror or splitter and that may cause the mirror or splitter to move into the direct view light path. Other embodiments are also possible.

In the illustrated example, the optical device 202 may include a first aperture 218 to receive light associated with a view area. The first aperture 218 may be aligned with one or more optical components configured to focus and direct the received light toward the viewing lens 216. The optical device 202 may also include a second aperture 224 that is transparent to a focused beam (such as a laser beam), allowing the focused beam to be directed toward the view area. The optical device 202 may include at least one additional aperture 222 and 226 to receive light reflected by one or more objects within the view area. The circuitry 220 may include a laser rangefinder circuit including driver circuitry configured to control the laser range finder to direct the focused beam toward the view area, optical sensors configured to receive the reflected light, and processing circuitry configured to determine a range to an object within the view area. The circuitry 220 may also include one or more optical sensors configured to receive light within a selected frequency range via one of the first aperture 218 or the other apertures 222 and 226.

In some embodiments, the optical device 202 may include one or more optical elements, which may be mechanically or electrically controlled to move into or out of a direct view light path in order to selectively direct the received light from the first aperture 218 toward an optical sensor, to selectively direct image data from a display toward the viewing lens 216, to superimpose a reticle onto the direct view image within a first focal plane, or any combination thereof.

Figure 3:
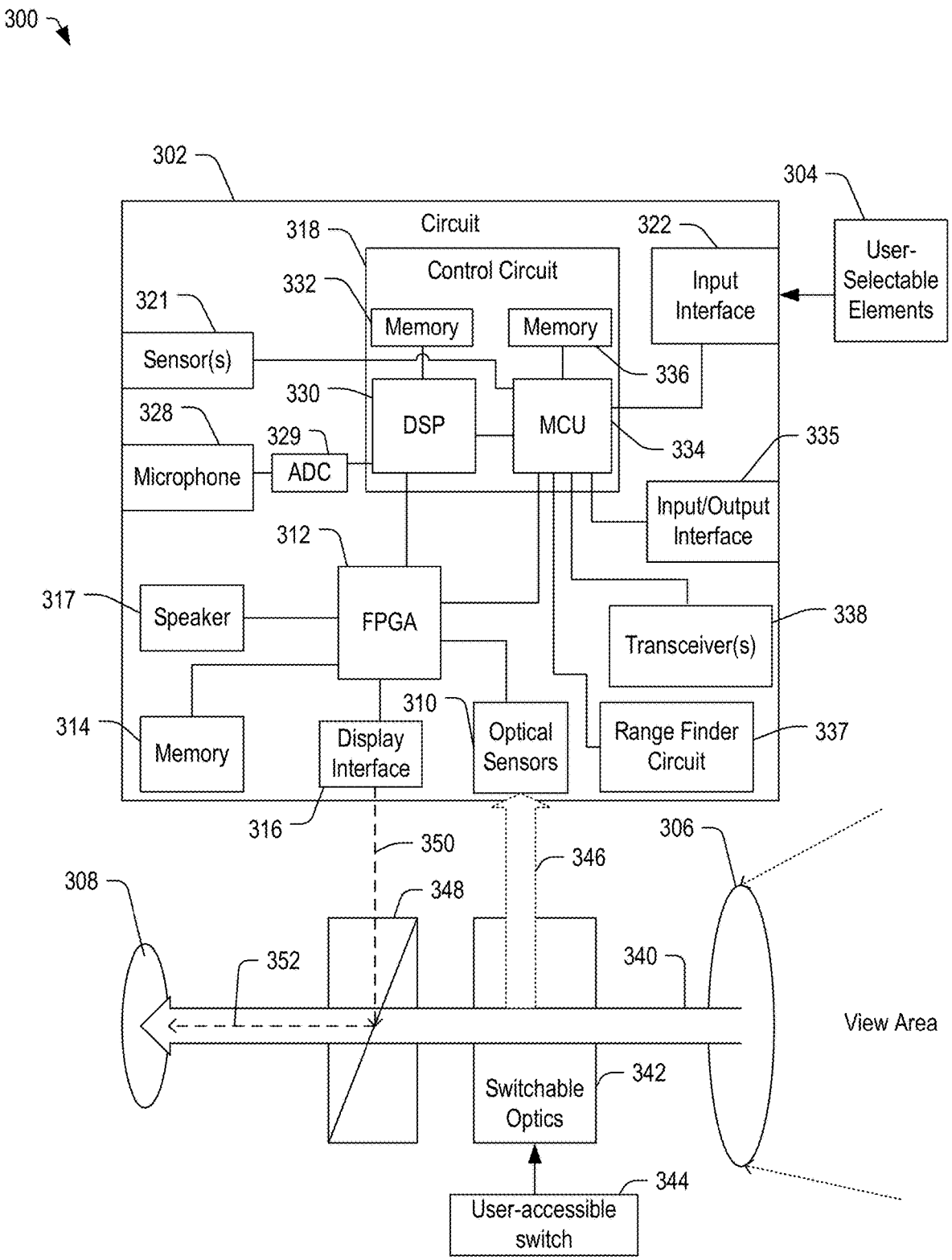
FIG. 3 depicts a block diagram of a portion of an optical device with selective night vision functionality accessible by a user-accessible mechanical switch, in accordance with certain embodiments of the present disclosure.

FIG. 3 depicts a block diagram of a system 300 including a portion of an optical device with selective night vision functionality accessible by a user-accessible mechanical switch, in accordance with certain embodiments of the present disclosure. The system 300 may represent an implementation of the optical device 102 of FIG. 1 or the optical device 202 of FIG. 2. The system 300 may include a circuit 302 coupled to one or more user-selectable elements 304, which may include mechanical buttons, levers, knobs, or electrical buttons, bi-stable switches, rocker switches, other elements, or any combination thereof. The circuit 302 may be an embodiment of the circuit 120 in FIG. 1 or the circuit 220 in FIG. 2.

The system 300 may further include an objective lens 306 configured to receive and focus light along an optical path 340 toward a viewing lens 308. The system 300 may also include switchable optics 342 that can be controlled by a user-accessible switch 344 to move into or out of the optical path 340 to direct at least a portion of the light from the optical path 340 toward one or more optical sensors 310 of the circuit 302. The system 300 can also include a light-splitting element 348 configured to direct image data 350 from a display interface 316 toward the viewing lens 308 as indicated by the dashed line 352.

The circuit 302 can include one or more optical sensors 310 configured to receive light from the optical path 340 (or optionally directly from the view area). The circuit 302 can further include a field programmable gate array (FPGA) 312 or other data processing circuit coupled to the optical sensors 310. The circuit 302 may further include a memory 314 that is coupled to the FPGA 312 and configured to store data and instructions. The circuit 302 may also include a speaker 317 and a display interface 316, both of which are coupled to the FPGA 312. Further, the circuit 302 may include a control circuit 318 coupled to the FPGA 312.

The control circuit 318 may include a digital signal processor (DSP) 330 and an associated memory 332. The DSP 330 may be coupled to the FPGA 312 and may also be coupled to a microphone 328 through an analog-to-digital converter 329 to receive audio data. Further, the DSP 330 may be coupled to a microcontroller unit (MCU) 334.

The control circuit 318 may also include the MCU 334 and an associated memory 336. The MCU 334 may be coupled to the FPGA 312 and to an input interface 322, which may be configured to receive signals from the one or more user-selectable elements 304. The MCU 334 may also be coupled to one or more sensors 321, such as environmental sensors (temperature, air pressure, altitude, humidity, wind, and so on), orientation sensors (incline, direction, motion, and so on), other sensors, or any combination thereof. Additionally, the MCU 334 may be coupled to one or more transceivers 338 to send and receive data, sound, images, or any combination thereof to a remote device through a network communications link. In some embodiments, the circuit 302 may also include one or more interfaces, such as Universal Serial Bus (USB) ports configured to receive a USB connector and to communicate with an external device through a USB cable. The MCU 334 may also be coupled to an input/output (I/O) interface 335, which may be coupled to an external circuit, such as a circuit within the trigger assembly 112 of FIG. 1 or the trigger assembly 212 of FIG. 2. Further, the MCU 334 may be coupled to a range finder circuit 337 (such as a laser range finder circuit, light detection and ranging (LIDAR) circuit, or another range finder circuit).

In some embodiments, the speaker 317 and microphone 328 may be incorporated in a headset that is coupled to circuitry 120 through an input/output interface (not shown). The headset may be worn by a user during operation.

In some embodiments, FPGA 312 may be configured to process image data and other data from optical sensors 122. FPGA 312 can process the image data to enhance image quality through digital focusing and gain control. Further, FPGA 312 can perform image registration and stabilization. Additionally, the FPGA 312 may integrate information received from the DSP 330, the MCU 334, or both to produce image data, which may be projected toward the light-splitting element 348, which may superimpose or otherwise direct the image data toward the viewing lens 308.

DSP 330 may execute instructions stored in memory 332 to process audio data from microphone 328 or image data from FPGA 312. In an example embodiment of an optical device that is a firearm scope, as a target moves within the view area, DSP 330 and the FPGA 312 may cooperate to perform target tracking and to apply a visual marker to a selected target within the image data. At least a portion of the image data and the visual marker may be provided to the display interface 316, which may be configured to project image data toward a light-splitting element 348 (or other optical element) configured to provide image data that is visible to the viewing lens 308.

In some embodiments, the DSP 330, the FPGA 312, or both may be configured to combine image data obtained from multiple optical sensors 310 and to provide the combined images to display interface 316. For example, if the system 300 is focused on a dark environment with isolated lighting, direct image data may be combined with information from the optical sensors 310 to provide night vision enhancements for the low-light portions of the view area. Image data from different types of optical sensors 310 (such as infrared sensors, low-light sensors, and other sensors) may be combined, fused, or otherwise processed to improve image quality or achieve a desired characteristic or look for an image that may be presented to the viewing lens 308. In a particular example, the FPGA 312 may cooperate with at least one of the DSP 330 and the MCU 334 to generate a heads-up display (HUD) that can be projected by the display interface 316 to be superimposed over a view area image directed toward the viewing lens 308. The HUD may display information such as a target range, ambient conditions (such as temperature, incline, wind speed, wind direction, humidity, other information, or any combination thereof), image data, other data, or any combination thereof.

In some embodiments, the FPGA 312 may be configured to cooperate with MCU 334 to mix the video data with reticle information and target tracking information (from DSP 330) and provide the resulting image data to the display interface 316. In some embodiments, the MCU 334 may select one or more of the optical sensors 310, to receive data associated with a particular visible frequency, which data may be processed to produce image data for presentation via the display interface 316.

In some embodiments, the FPGA 312 or the MCU 334 may compare illumination data from optical sensors 122 to a threshold value, and if the illumination data falls below a threshold, the FPGA 312 or the MCU 334 may alter the operating mode of the optical device, such as switching from a day view image mode to a night view image mode or from either a day view image or night view image mode to a fused image mode. For example, in a day view image mode, the optical sensors 310 may be disabled, or the switchable optics 342 may be switched out of the light path 340 or otherwise disabled so as to not direct light from the view area toward the optical sensors 310.

In some embodiments, if the measured light falls below a threshold or in response to an input received from the user-selectable element 304, the user-accessible switch 344, or any combination thereof, the MCU 334 may be configured to receive light 346 from the view area at the optical sensors 310. In an example, the user-accessible switch 344 may be configured to mechanically move the switchable optics 342 into the light path 340, causing at least a portion of the light to be redirected toward the optical sensors 310. In another example, the user-accessible switch 344 may be coupled to the MCU 334, which may be configured to control an actuator to move the switchable optics 342 into the light path 340 (or out of the light path 340 when in a day view mode). The optical sensors 310 may generate signal data that is proportional to the received light, and may provide the signal data to the FPGA 312. In one mode, the FPGA 312 may cooperate with the DSP 330 and the MCU 334 to provide image data to the viewing lens 308 instead of or combined with the direct view provided by the light path 340.

In the illustrated example, the user-accessible switch 344 may be accessed by a user to mechanically switch the switchable optics 342 into or out of the light path 340. The user-accessible switch 344 may include a lever accessible by a user to mechanically adjust the switchable optics 342. In an example, the switchable optics 342 may include a mirror element that can be pivoted into or out of alignment with the light path 340 based on a position of the user-accessible switch 344. Other embodiments are also possible.

While FIG. 3 depicts an example embodiment of a circuit 302, at least some of the operations of circuit 302 may be controlled using one or more general purpose controllers or processors executing programmable instructions. Further, the circuit 302 may include additional or fewer elements, certain elements may be combined or separated into additional modules or circuits, and processes attributed to one component may be executed by another component without departing from the present disclosure. Other variations are also possible.

Figure 4:
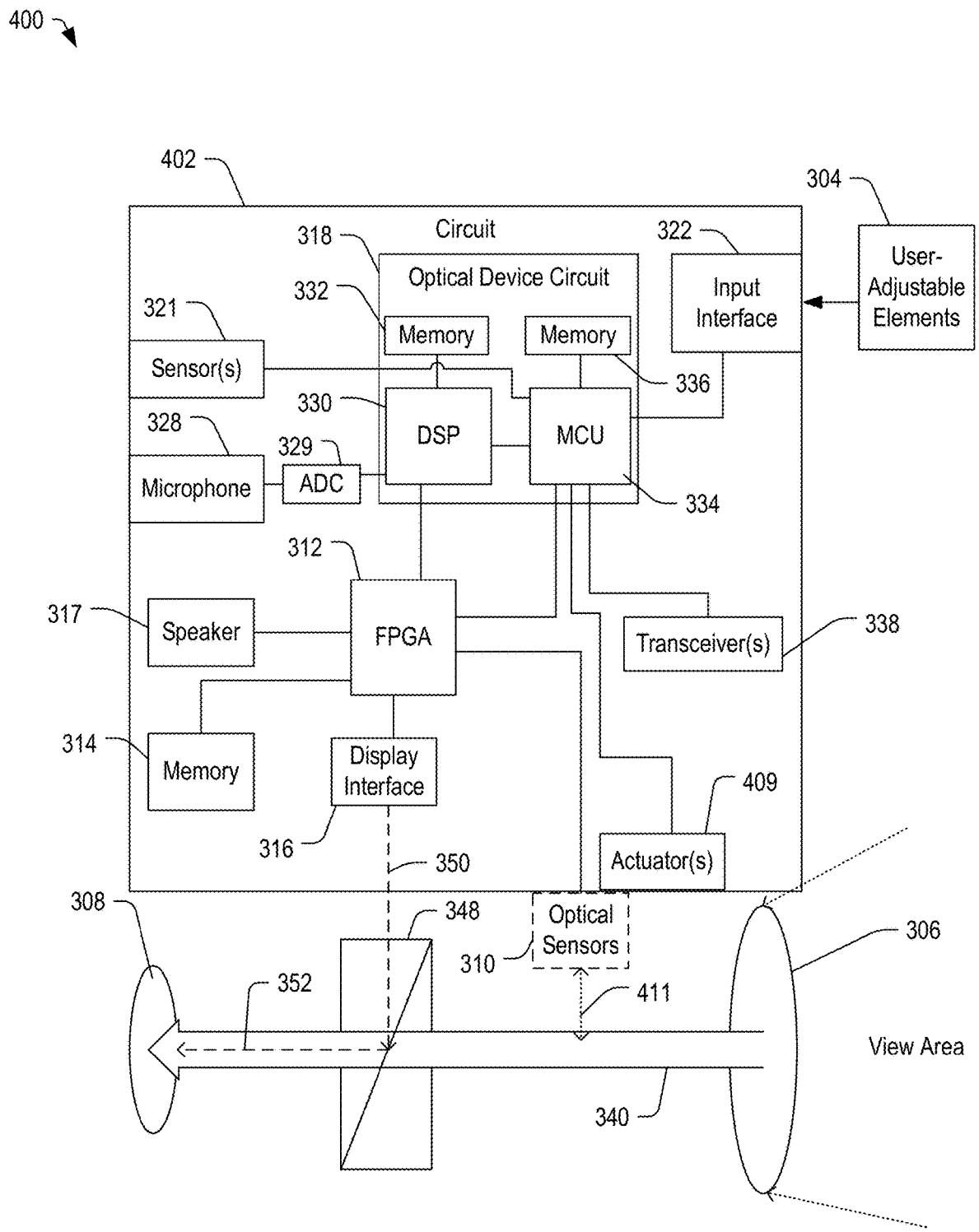
FIG. 4 depicts a block diagram of a portion of an optical device with selective night vision functionality accessible by a user-accessible button, in accordance with certain embodiments of the present disclosure.

FIG. 4 depicts a block diagram of a system 400 including a portion of an optical device with selective night vision functionality that can be activated by a user-accessible button, in accordance with certain embodiments of the present disclosure. The system 400 includes a circuit 402, which may include all of the elements of the circuit 302 in FIG. 3, and which may include may include one or more actuators 409. The one or more actuators 409 may be responsive to at least one signal from the MCU 334 to move one or more optical sensors 310 into the optical path 340 along a movable path, generally indicated at 411. Alternatively, the actuators 409 may be configured to pivot a switchable element 342 (such as a mirror or a light splitting element) into or out of the light path.

In a particular embodiment, the optical sensors 310 may be selectively activated by mechanically moving the optical sensors 310 into the light path 340 or by moving the switchable element 342 into the light path 340 to redirect at least a portion of the received light toward the optical sensors 310. In other embodiments, rather than moving the optical sensors 310, a light-splitting element may be moved along the path 411 into and out of the light path 340. Additionally, in other embodiments, the sensor could remain stationary, and the display or the mirror or light-splitting element for the display could be moved.

In a day view image mode, the optical sensors 310 or the light-splitting element may be moved by the actuators 409 to a position that is removed from the light path 340. In a nigh view image mode or a fused image mode, the optical sensors 310 or the light-splitting element may be moved by the actuators 409 to a position to receive at least a portion of the light from the view area.

It should be appreciated that the optical device can be configured to provide a night view image mode or a fused image mode based on received light. The mechanical structure that can be selectively enabled, actuated, or otherwise adjusted to enable the night view or fused image modes can include a variety of different configurations and component elements. FIGS. 5-11 depict some of the possible configurations of the optical elements of an optical scope. The reference numbers are reused in the following figures to indicate the same or similar elements.

Figure 5:
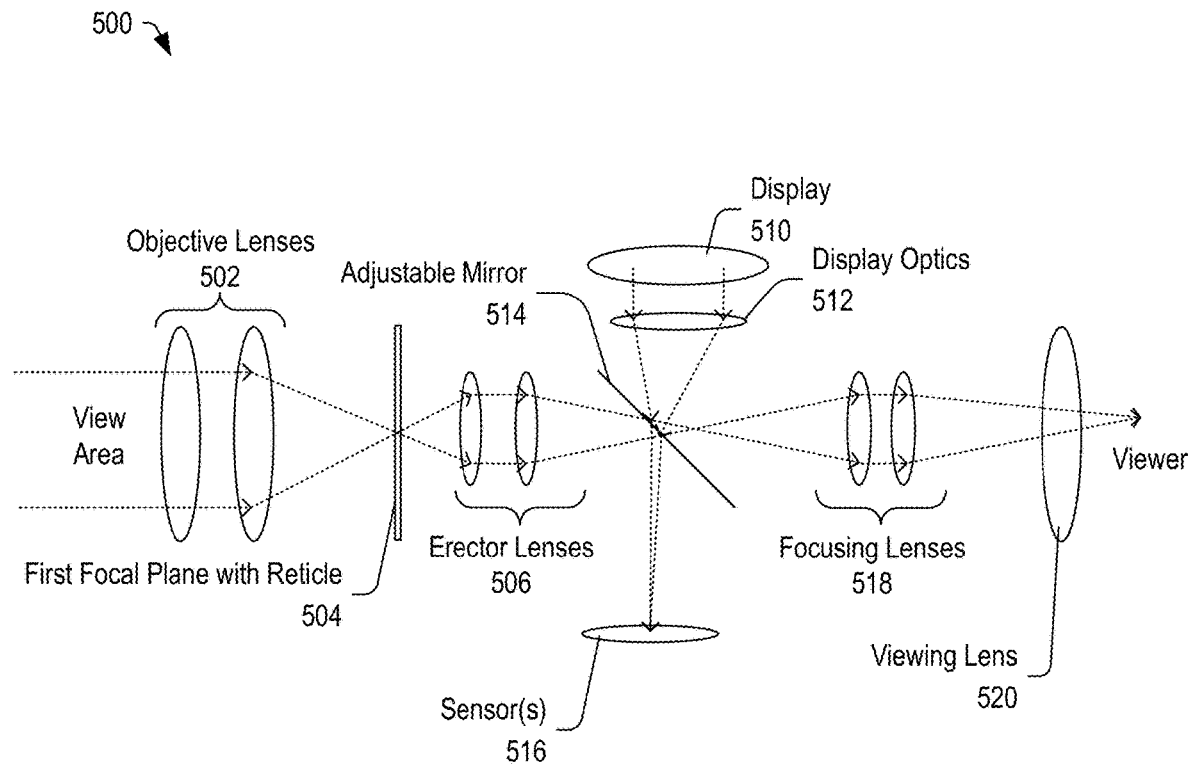
FIG. 5 depicts a diagram of a portion of an optical device with a single actuatable element configured to enable selective night vision functionality, in accordance with certain embodiments of the present disclosure.

FIG. 5 depicts a diagram of a portion of an optical device 500 with a single actuatable element configured to enable selective night vision functionality, in accordance with certain embodiments of the present disclosure. The optical device 500 may be an embodiment of the optical device 102 in FIG. 1, the optical device 202 in FIG. 2, the optical device of the system 300 in FIG. 3, or the optical device of the system 400 in FIG. 4.

The optical device 500 may include objective lenses 502 configured to receive light from a view area and to focus the received light toward a first focal plane 504, which may include a mechanical wire, printed, etched, or display-projected reticle. The optical device 500 may further include erector lenses 506, which receive the focused light from the objective lenses 502 and which reorient the focused light. The optical device 500 may further include a display 510 (or display interface) configured to provide image data toward an adjustable mirror 514 through display optics 512. The adjustable mirror 514 may be configured to direct the image data from the display 510 toward the viewing lens 520 through the focusing lenses 518. The adjustable mirror 514 may also direct light from the view area toward one or more sensors 516. In some embodiments, the adjustable mirror 514 may be pivoted into or out of the light path using the actuator 409 or in response to selection of a user-selectable element 344. Other embodiments are also possible.

It should be appreciated that the adjustable mirror 514 may be rotated or otherwise moved into or out of the focal plane, depending on the operating mode. Further, the adjustable mirror 514 could be partially transmissive to certain light frequencies and may be configured to direct light from the display 510 to superimpose the display data onto the direct view image. In a night view image mode or a fused image mode, a processor circuit (such as an FPGA, a DSP, an MCU, or any combination thereof) may process image data captured by the one or more sensors 516 to produce image data, which may be projected by the display 510 through the display optics 512 and onto the surface of the adjustable mirror 514.

In some embodiments, in a day view image mode, the adjustable mirror 514 may be rotated or moved out of the light path (either mechanically based on the user-selectable switch 344 or electrically via actuator 409). In other embodiments, in the day view image mode, the adjustable mirror 514 may be rotated or moved (either mechanically based on the user-selectable switch 344 or electrically via actuator 409) so that light projected by the display 510 is not reflected toward the focusing lenses 518. Other embodiments are also possible.

The one or more sensors 516 may include optical sensors configured to generate an electrical signal proportional to the received light at particular frequencies. For example, the sensors 516 can include low-light sensors, infrared sensors, other types of optical sensors, or any combination thereof.

It should be appreciated that the objective lenses 502 may be examples of the object lens 118 of FIG. 1, 218 of FIG. 2, 306 of FIG. 3, or 406 of FIG. 4. Further, the viewing lens 520 may be an example of the viewing lens 116 of FIG. 1, 216 of FIG. 2, 308 of FIG. 3, or 408 of FIG. 4. Other embodiments are also possible.

Figure 6:
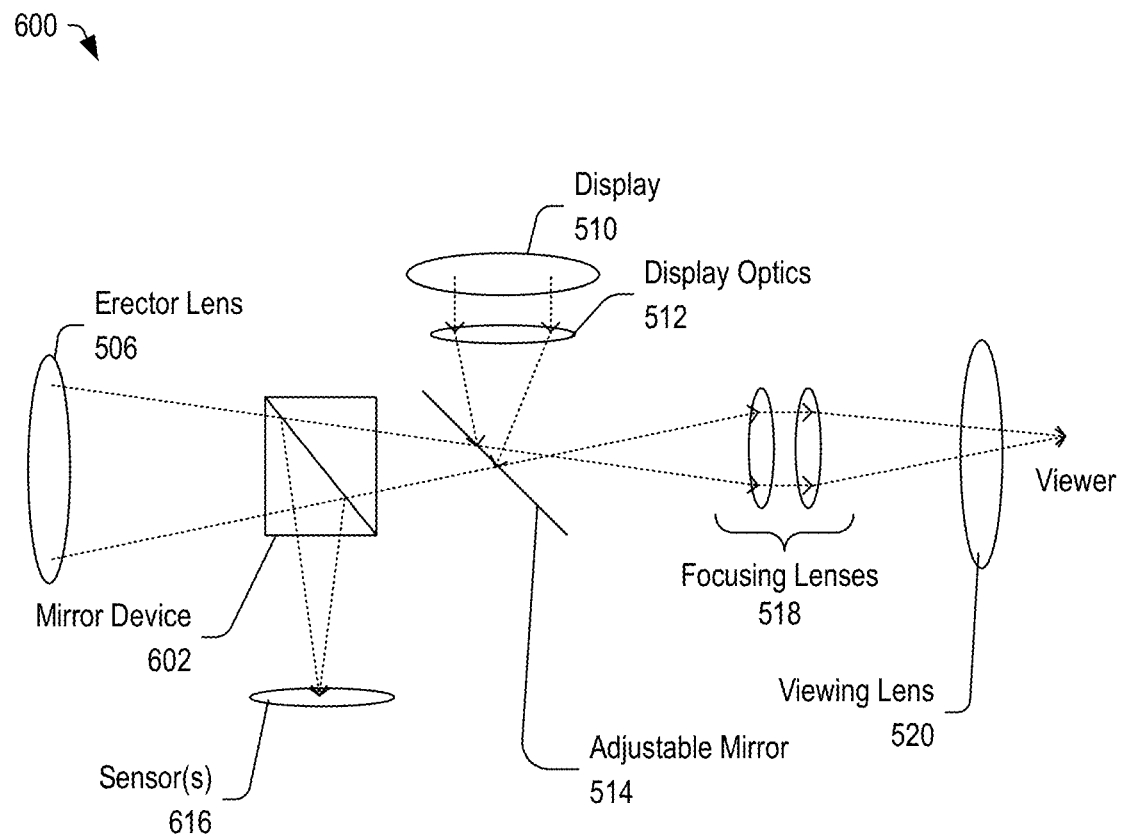
FIG. 6 depicts a diagram of a portion of an optical device with a pair of light splitting elements configured to enable selective night vision functionality, in accordance with certain embodiments of the present disclosure.

FIG. 6 depicts a diagram of a portion of an optical device 600 with a pair of light splitting elements configured to enable selective night vision functionality, in accordance with certain embodiments of the present disclosure. The optical device 600 may be an embodiment of the optical device 102 in FIG. 1, the optical device 202 in FIG. 2, the optical device of the system 300 in FIG. 3, or the optical device of the system 400 in FIG. 4. The optical device 600 includes a light-splitting element (mirror device 602 between the erector lenses 506 and the adjustable mirror 514. The mirror device 602 may direct light from the erector lenses 506 toward one or more sensors 616, and may be partially transmissive to some frequencies of light.

In this example, in a day view image mode, the one or more sensors 616 may be turned off (or signals from the sensors 616 may be ignored by the processing circuitry). In a night view image mode or a fused image mode, the sensors 616 may be activated to convert light from the view area into an electrical signal proportional to the received light.

In the illustrated example, the mirror device 602 may include a mirror surface (such as a prismatic surface) to direct light toward the sensors 616. In some embodiments, the mirror surface may be electrically activated.

Figure 7:
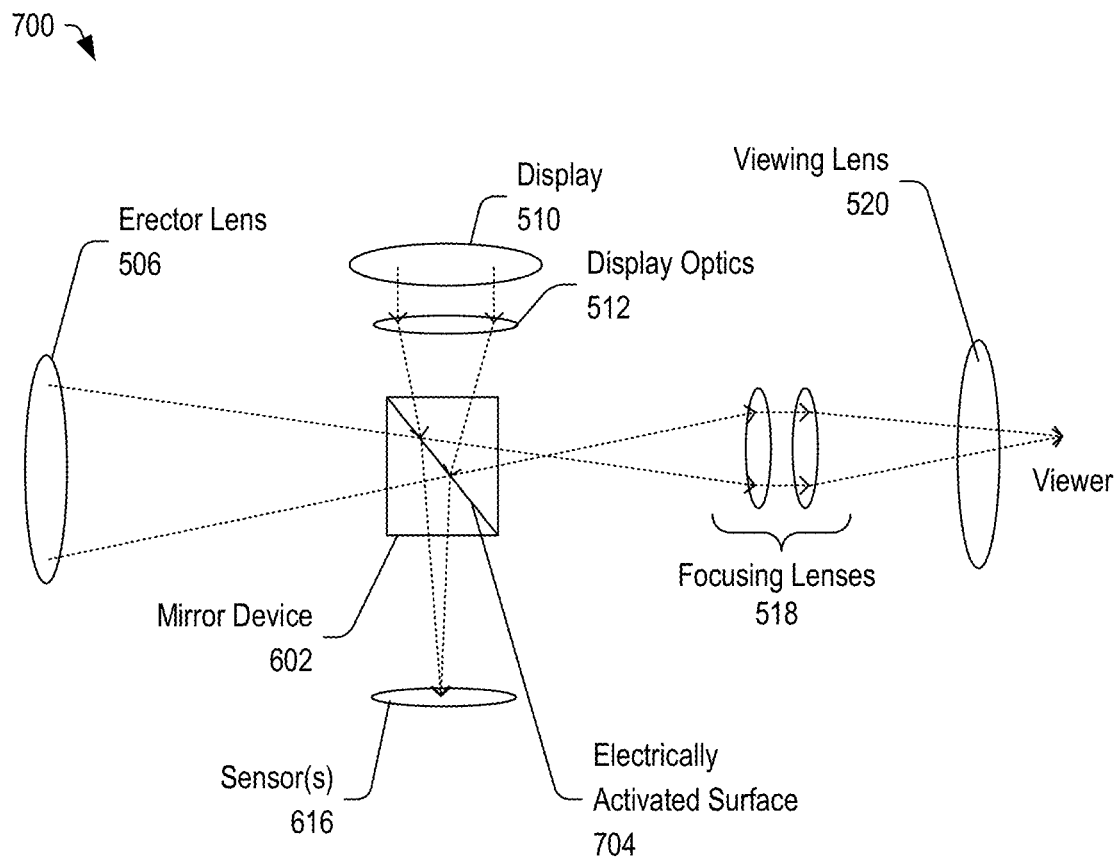
FIG. 7 depicts a diagram of a portion of an optical device with an electrically controllable light splitting element configured to enable selective night vision functionality, in accordance with certain embodiments of the present disclosure.

FIG. 7 depicts a diagram of a portion of an optical device 700 with an electrically controllable light splitting element configured to enable selective night vision functionality, in accordance with certain embodiments of the present disclosure. In this example, the mirror device 602 includes an electrically activated surface 704, which may be responsive to a signal from at least one of the FPGA or MCU of the optical device 700 to electrically activate the surface 704 to selectively reflect light toward the sensors 616 and to direct light from the display 510 toward the viewing lens 520.

In a day view image mode, the electrically activated surface 704 may be disabled such that light from the display 510 is not reflected toward the viewing lens 520. Further, when the surface is disabled or inactive, light from the viewing area is not reflected toward the sensors 616. In a night view image mode or a fused image mode, the FPGA or MCU of the optical device 700 may process data received from the one or more sensors 616 and may produce image data that can be projected onto the electrically activated surface 704 of the mirror device 602. Other embodiments are also possible.

Figure 8:
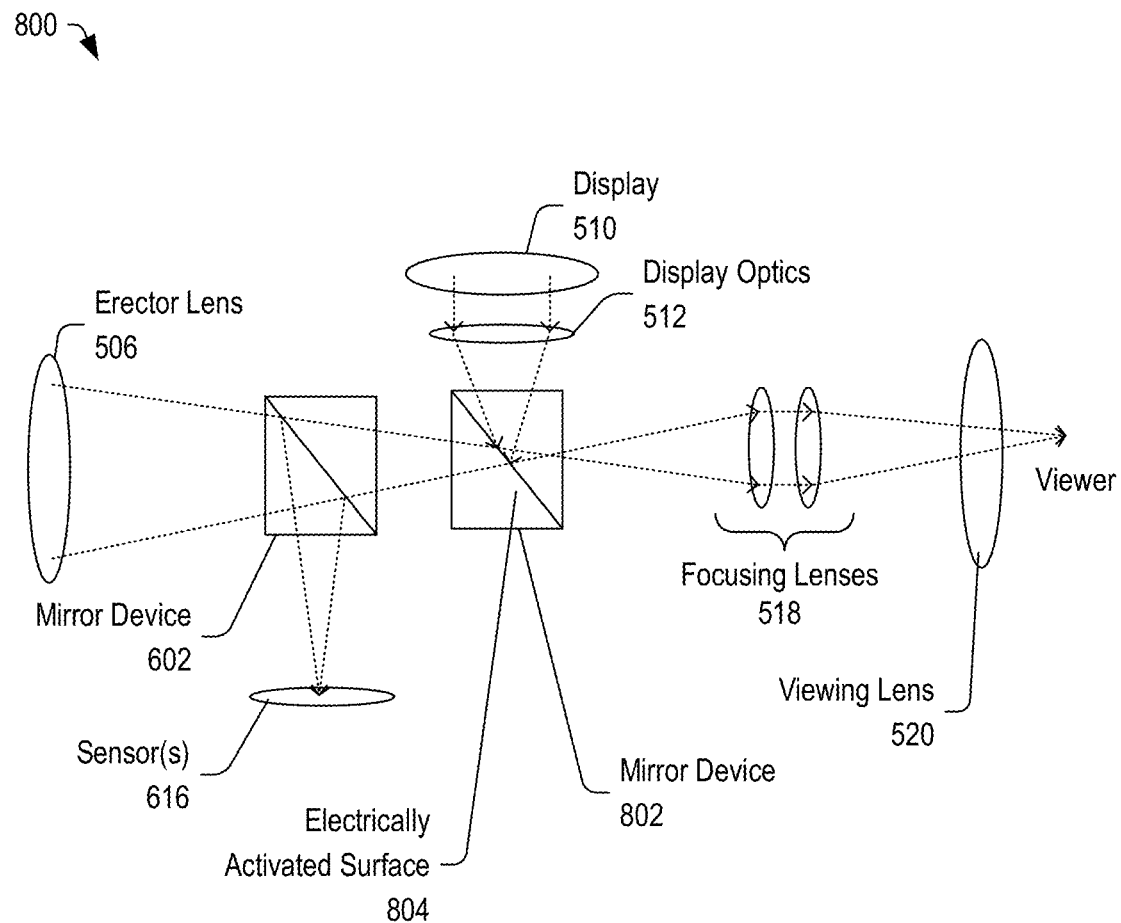
FIG. 8 depicts a diagram of a portion of an optical device with a pair of light splitting elements, at least one of which may be an electrically controllable light splitting element, configured to enable selective night vision functionality, in accordance with certain embodiments of the present disclosure.

FIG. 8 depicts a diagram of a portion of an optical device 800 with a pair of light splitting elements, at least one of which may be an electrically controllable light splitting element, configured to enable selective night vision functionality, in accordance with certain embodiments of the present disclosure. In this embodiment, a first mirror device 602 may be partially transmissive to some frequencies of light and may be positioned between the erector lenses 506 and the viewing lens 520 to direct a portion of the received light toward the sensors 616. The optical device 800 may further include a second mirror device 802 with an electrically activated surface 804 may be positioned between the first mirror device 802 and the view lens 520. The second mirror device 802 may be configured to direct light projected by the display 510 toward the viewing lens 520.

Figure 9:
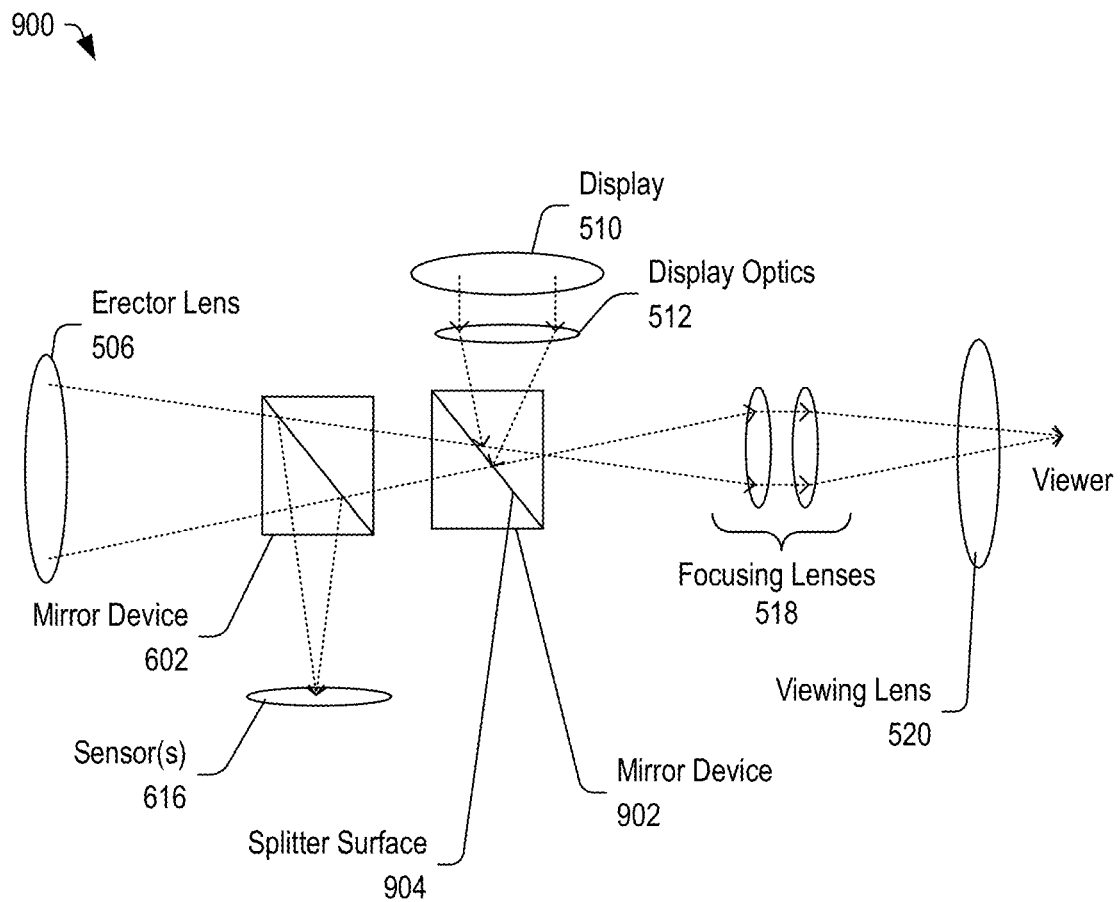
FIG. 9 depicts a diagram of a portion of an optical device with a pair of light splitting elements configured to enable selective night vision functionality, in accordance with certain embodiments of the present disclosure.

FIG. 9 depicts a diagram of a portion of an optical device 900 with a pair of light splitting elements configured to enable selective night vision functionality, in accordance with certain embodiments of the present disclosure. The optical device 900 includes a first mirror device 602 between the erector lenses 506 and the viewing lens 520. The first mirror device 602 may direct light toward one or more sensors 616. The optical device 900 may further include a second mirror device 902 between the mirror device 602 (which may be partially transmissive to some frequencies of light) and the viewing lens 520. The second mirror device 902 may include a light-splitting surface 904, which may be configured to direct image data from the display 510 toward the viewing lens 520 in conjunction with the light from the view area. This light-splitting surface is partially transmissive to certain frequencies of light.

Figure 10:
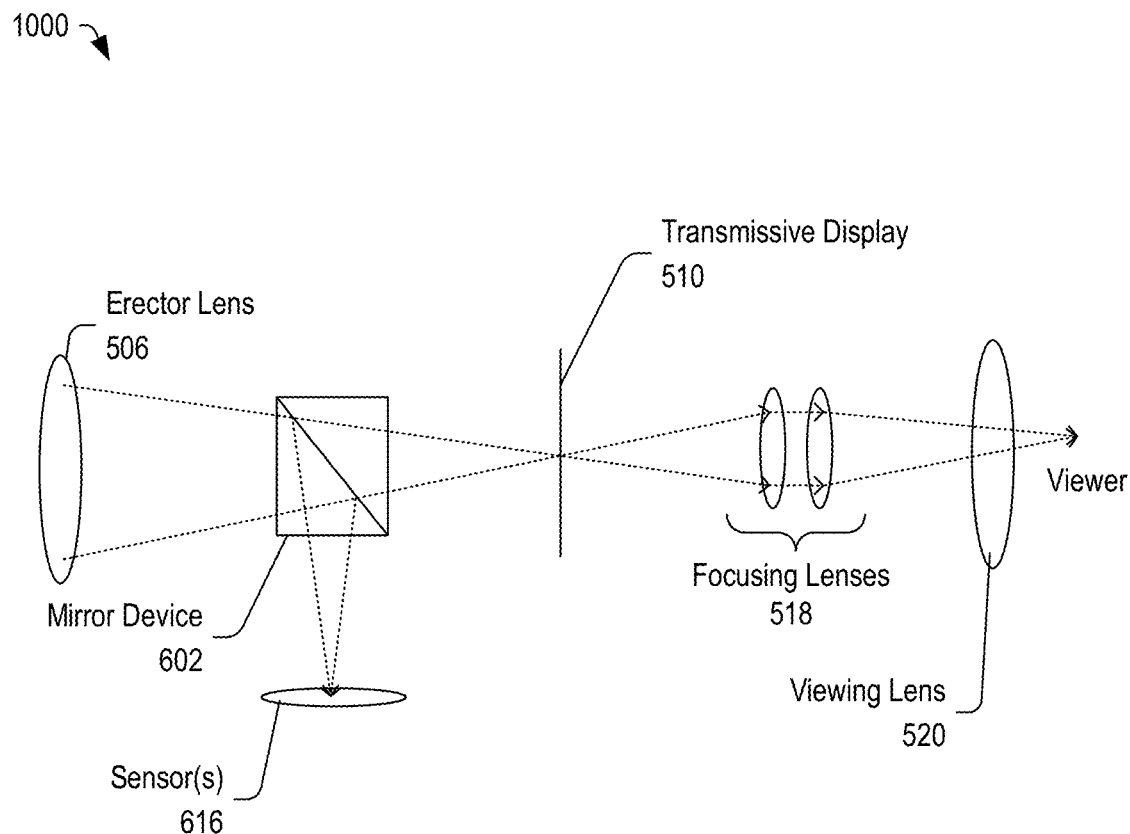
FIG. 10 depicts a diagram of a portion of an optical device with a light splitting element and including a transmissive display, in accordance with certain embodiments of the present disclosure.

FIG. 10 depicts a diagram of a portion of an optical device 1000 with a light splitting element and including a transmissive display, in accordance with certain embodiments of the present disclosure. The optical device 1000 may include a mirror device 602 (which may be partially transmissive to some frequencies of light) between the erector lens 506 and the viewing lens 520. The mirror device 602 may direct a portion of the light from the view area toward the one or more sensors 616. The optical device 1000 may also include a transmissive display between the mirror device 602 and the viewing lens 520. The display could be a liquid crystal display (LCD), organic light-emitting diode (OLED) display, or another type of display.

In a particular example, the transmissive display may be configured to selectively superimpose image data on the direct view image of the field of view. Other embodiments are also possible.

Figure 11:
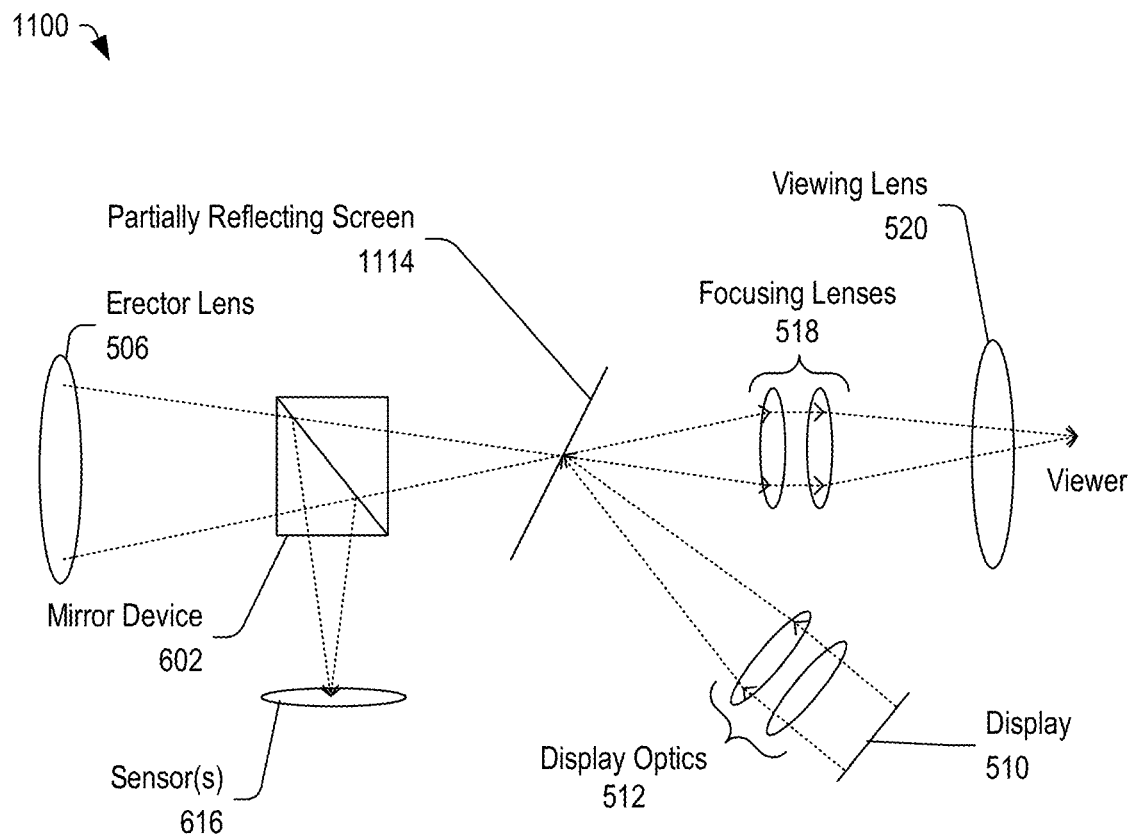
FIG. 11 depicts a diagram of a portion of an optical device with a light-splitting element and including a partially reflective screen, in accordance with certain embodiments of the present disclosure.

FIG. 11 depicts a diagram of a portion of an optical device 1100 with a light-splitting element (mirror device 602) and including a partially reflective screen 1114, in accordance with certain embodiments of the present disclosure. The mirror device 602 (which may be partially transmissive to some frequencies of light) may direct a portion of the light from a view area toward the one or more sensors 616. A partially reflecting screen 1114 may be positioned between the mirror device 602 and the viewing lens 520. The display 510 may project image data through display optics 512 onto the partially reflecting screen 1114. Thus, the projected image data and the direct view image can be presented to the viewing lens 520.

In the above discussion, the reflective surfaces of the mirror devices may be configured to reflect light of selected frequencies and to allow light of other frequencies to pass through. In some embodiments, the reflective surfaces may be electrically controlled to selectively reflect light toward the sensors or to direct light from the display to the viewing lens. Further, in some embodiments, the reflective surfaces may be actuated into the light path. In other embodiments, the sensors and the display may be selectively activated, depending on the operating mode. In this example, the sensors and the display may be inactive in a day view image mode, and the sensors and the display may be active in a night view image mode or a fused image mode.

Figure 12:
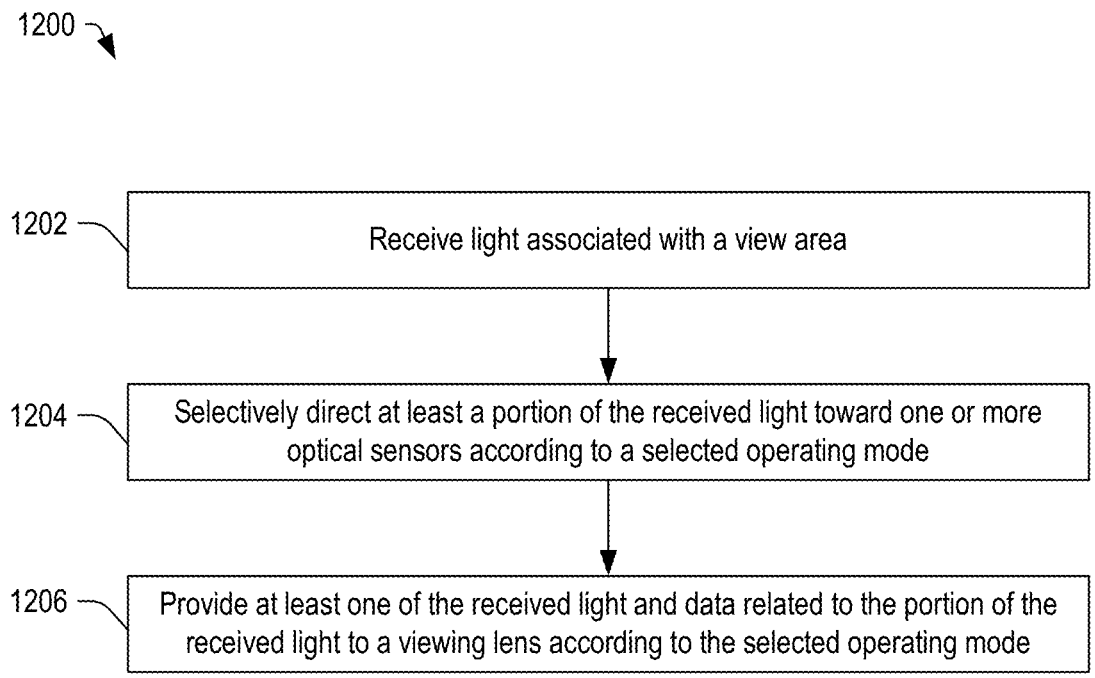
FIG. 12 depicts a block diagram of a method of switching between an optical device having a day view optical functionality and selectable a night vision functionality, in accordance with certain embodiments of the present disclosure.

FIG. 12 depicts a block diagram of a method 1200 of switching between an optical device having a day view optical functionality and selectable a night vision functionality, in accordance with certain embodiments of the present disclosure. At 1202, the method 1200 may include receiving light associated with a view area. The light may be received through a single aperture or through multiple apertures.

At 1204, the method 1200 can include selectively directing at least a portion of the received light toward one or more of the optical sensors according to a selected operating mode. The light may be selectively directed toward the optical sensors using electrically controlled mirror elements, fixed mirror elements, partially reflective mirror elements, other types of mirror elements, or any combination thereof. In a particular example, the mirror elements or light-splitting elements may be switched into or out of a light path, depending on the operating mode. In another example, a mirror element may be electrically controlled to be at least partially transmissive or reflective in response to an electrical signal. Other embodiments are also possible.

At 1206, the method 1200 may be configured to provide at least one of the received light and data related to the portion of the received light to a viewing lens according to the selected operating mode. In a day view image mode, the received light may or may not be directed toward one or more sensors. Electrically controlled surfaces may be inactive, allowing direct view image light to pass through without reflection. In some embodiments, the mirror elements may be moved so that they do not reflect the light. In other embodiments, the sensor elements and a display element may be controlled to selectively capture optical data and to selectively provide image data from the FPGA to a surface that can direct the image data toward a viewing lens.

In a night image view or a fused image view mode, the mirror elements may direct light toward sensors that are active, and the display may project image data, which may be directed toward the viewing lens. Other embodiments are also possible.

Figure 13:
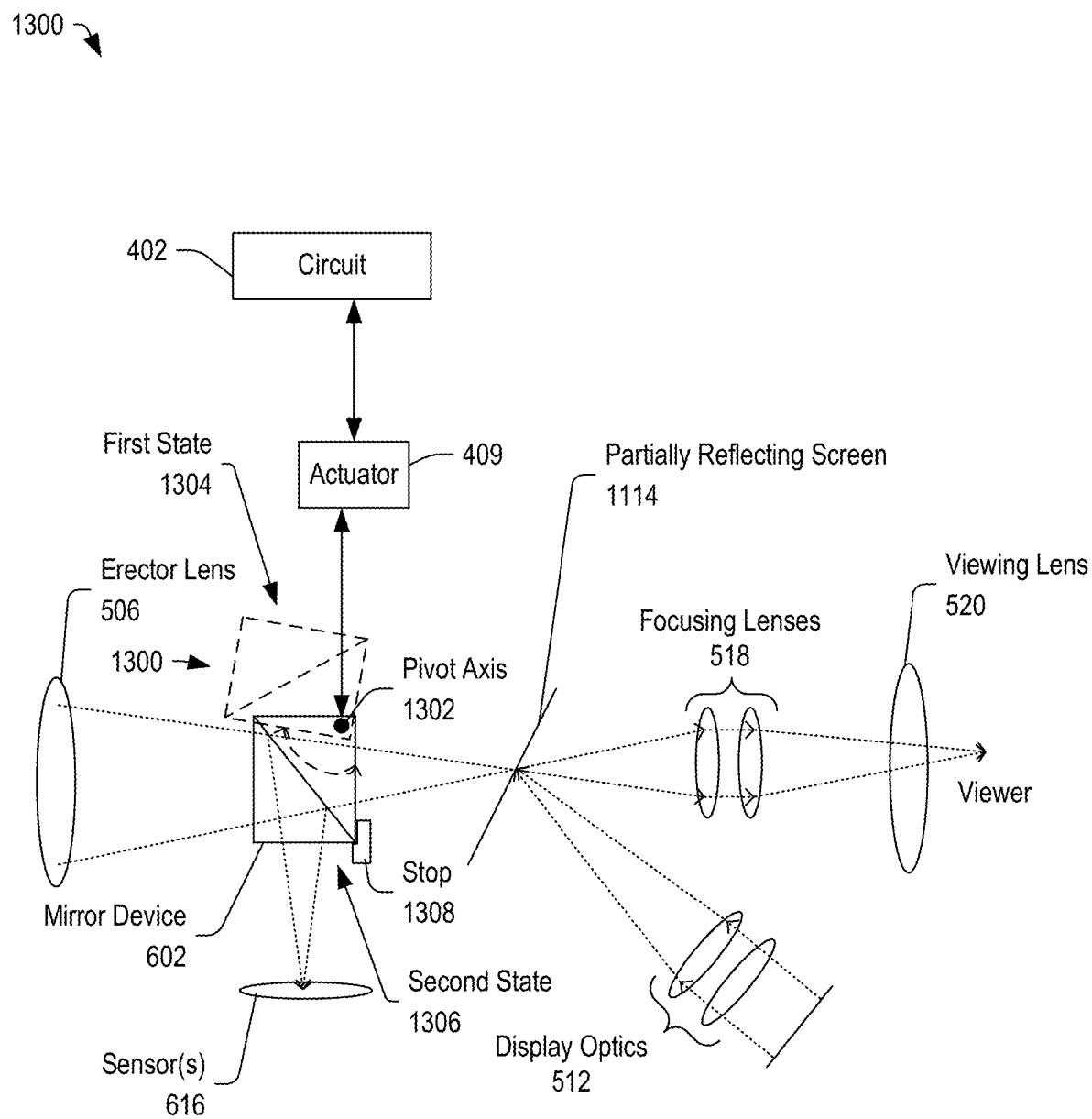
FIG. 13 depicts a diagram of a portion of an optical device including a light-splitting element that can be mechanically adjusted into and out of a light path, in accordance with certain embodiments of the present disclosure.

FIG. 13 depicts a diagram of a portion of an optical device 1300 including a light-splitting element that can be mechanically adjusted into and out of a light path, in accordance with certain embodiments of the present disclosure. The optical device 300 may include the circuit 402 coupled to an actuator 409 that may be configured to adjust the mirror device 602 from a first state 1304 to a second state 1306 by causing the mirror device 602 to pivot about the axis 1302. The optical device 1300 may further include a stop 1308 configured to engage a portion of the mirror device 602 to ensure that the mirror device 602 is positioned correctly in the second state 1306. Other embodiments are also possible.

In some embodiments, the circuit 402 may cause the mirror device 602 to pivot about the axis 1302. In an example, in a day view mode, the circuit 402 may control the actuator 409 to maintain the mirror device 602 in the first state 1304 (as shown in phantom). In a night view for second mode, the circuit 402 may control the actuator 409 to pivot the mirror device 602 about the axis 1302 into a second position or second state 1306 against the stop 1308, causing the mirror device 602 (which may be partially transmissive to at least some frequencies of light) to direct at least a portion of the light toward the sensors 616.

The above circuits, systems, devices, and methods may be directed to firearm scopes, spotting scopes, telescopes, binoculars, cameras, other optical devices, or any combination thereof. Similarly, steps of the methods may be performed by other device elements than those described, or some elements may be combined or eliminated without departing from the scope of the present disclosure.

In conjunction with the systems, methods, and devices described above, an optical device may include at least one light-splitting element (such as a mirror, a prism, and the like) configured to selectively direct a portion of received light from a view area toward one or more optical sensors. The light-splitting element may be electrically actuated, mechanically actuated, or otherwise adjusted to selectively direct light toward the sensors according to a selected mode of operation.

While the present invention has been described with reference to preferred embodiments, workers skilled in the art will recognize that changes may be made in form and detail without departing from the scope of the present disclosure. In accordance with various embodiments, the methods described herein may be implemented as one or more software programs running on a computer processor or controller. Dedicated hardware implementations including, but not limited to, application specific integrated circuits, programmable logic arrays, and other hardware devices can likewise be constructed to implement the methods described herein. Further, the methods described herein may be implemented as a computer readable storage device or memory device including instructions that, when executed, cause a processor to perform the methods.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above embodiments, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising: an optical device configured to provide a day view image mode and a night view image mode, the optical device including: a plurality of lenses including an objective lens to receive light from a viewing area and including a viewing lens through which a user may perceive at least a portion of the received light, the plurality of lenses configured to focus the received light along a light path from the objective lens to the viewing lens; an optical element disposed between the viewing area and the viewing lens and configured to selectively redirect at least a portion of the light from the light path; a control circuit including one or more sensors, at least one processor circuit, and a display interface, the control circuit configured to selectively disable at least one of the display interface and the one or more sensors in the day view image mode and to selectively enable at least one of the display interface and the one or more sensors in a night view image mode.

2. The apparatus of claim 1, wherein the optical element comprises an electrically controllable reflective surface configured to redirect the portion of the light toward the one or more sensors in response to an electrical signal.

3. The apparatus of claim 1, wherein the optical element comprises an adjustable mirror configured to mechanically switch into the light path to redirect the portion of the light toward the one or more sensors.

4. The apparatus of claim 3, wherein the optical element is further configured to direct image data from the display interface toward the view lens in line with a direct image view from the objective lens.

5. The apparatus of claim 1, wherein the one or more optical sensors are configured to generate an electrical signal proportional to selected light frequencies within the at least the portion.

6. The apparatus of claim 5, wherein the one or more optical sensors include at least one of a complementary metal oxide semiconductor (CMOS) array, a charge-coupled device (CCD) array, an avalanche photodiode (APD) array, a cooled or uncooled infrared detector array, a short-wave infrared (SWIR) array, a midwave infrared (MWIR) sensor, and a long wave infrared sensor (LWIR).

7. The apparatus of claim 1, further comprising a first focal plane including a reticle.

8. The apparatus of claim 1, further comprising a firearm coupled to the optical device, the firearm including a trigger assembly electrically coupled to the at least one processor circuit.

9. An apparatus comprising:
   an optical device configured to provide a day view image mode and a night view image mode, the optical device including:
      an optics assembly configured to receive light from a view area;
      a control circuit including one or more sensors and a display interface, the control circuit configured to receive a mode selection input and to selectively enable at least one of the display interface and the one or more sensors in response to the mode selection input indicating a night view image mode; and
      an optical element responsive to a signal from the control circuit to direct at least a portion of the light toward the one or more sensors.

10. The apparatus of claim 9, wherein the one or more sensors are configured to generate an electrical signal proportional to selected light frequencies within the at least the portion of the light.

11. The apparatus of claim 9, wherein the optical element comprises an electrically controllable reflective surface configured to redirect the at least the portion of the light toward the one or more sensors in response to the signal.

12. The apparatus of claim 9, wherein the optical element comprises an adjustable mirror configured to mechanically switch into a light path to redirect the at least the portion of the light toward the one or more sensors in response to the signal.

13. The apparatus of claim 12, wherein:
   the optics assembly includes an objective lens and a viewing lens; and
   the optical element is further configured to direct image data from the display interface toward the view lens in line with a direct image view from the objective lens in the night view image mode.

14. The apparatus of claim 9, wherein the one or more optical sensors are configured to generate an electrical signal proportional to selected light frequencies within the at least the portion.

15. The apparatus of claim 14, wherein the one or more optical sensors include at least one of a complementary metal oxide semiconductor (CMOS) array, a charge-coupled device (CCD) array, an avalanche photodiode (APD) array, a cooled or uncooled infrared detector array, a short-wave infrared (SWIR) array, a midwave infrared (MWIR) sensor, and a long wave infrared sensor (LWIR).

16. The apparatus of claim 9, further comprising a firearm coupled to the optical device, the firearm including a trigger assembly electrically coupled to the at least one processor circuit.

17. An apparatus comprising:
   an optical device including:
      an optics assembly configured to receive light from a view area through an objective lens and to focus the light toward a viewing lens;
      one or more optical sensors;
      an optical element configured to selectively direct at least a portion of the light toward the one or more optical sensors; and
      a control circuit configured to receive a mode selection input and, when the mode selection input indicates a day view image mode, to selectively disable the one or more sensors and to control the optical element to not redirect the at least the portion to the one or more optical sensors, and, when the mode selection input indicates a night view image mode, the control circuit configured to selectively enable the one or more sensors and to control the optical element to direct the at least the portion of the light toward the one or more optical sensors.

18. The apparatus of claim 17, wherein the optical element comprises an electrically controllable reflective surface configured to redirect the at least the portion of the light toward the one or more sensors in response to the signal.

19. The apparatus of claim 17, wherein the optical element comprises an adjustable mirror configured to mechanically switch into a light path to redirect the at least the portion of the light toward the one or more sensors in response to the signal.

20. The apparatus of claim 17, further comprising:
   a processor coupled to the one or more sensors and configured to generate image data based on signals from the one or more sensors;
   a second optical element in a focal plane of the viewing lens; and
   a display interface coupled to the processor and configured to provide the image data to the second optical element.

* * * * *